United States Patent
Ishibashi et al.

(10) Patent No.: US 7,468,647 B2
(45) Date of Patent: Dec. 23, 2008

(54) LINEAR SOLENOID HAVING STATOR CORE AND PLUNGER

(75) Inventors: Ryo Ishibashi, Kariya (JP); Hiroo Tsujimoto, Kariya (JP); Motoyoshi Ando, Nagoya (JP)

(73) Assignee: Denso Corporation (JP)

( * ) Notice: Subject to any disclaimer, the term of this patent is extended or adjusted under 35 U.S.C. 154(b) by 115 days.

(21) Appl. No.: 11/413,019

(22) Filed: Apr. 28, 2006

(65) Prior Publication Data

US 2006/0243938 A1 Nov. 2, 2006

(30) Foreign Application Priority Data

Apr. 28, 2005 (JP) .............................. 2005-131726

(51) Int. Cl.
*H01F 3/00* (2006.01)
*H01F 7/08* (2006.01)
*F16K 31/02* (2006.01)

(52) U.S. Cl. .................. 335/281; 335/220; 251/129.15

(58) Field of Classification Search ................. 335/281, 335/84, 91, 153, 296, 297; 336/83, 212, 336/223; 251/129.15
See application file for complete search history.

(56) References Cited

U.S. PATENT DOCUMENTS

| | | | | |
|---|---|---|---|---|
| 4,547,757 A * | 10/1985 | Yamada | ....................... | 335/296 |
| 5,197,507 A * | 3/1993 | Miki et al. | ....................... | 137/1 |
| 5,251,659 A * | 10/1993 | Sturman et al. | ............. | 137/339 |
| 5,848,613 A * | 12/1998 | Sakaguchi et al. | ...... | 137/625.65 |
| 5,868,167 A * | 2/1999 | Miki et al. | ............. | 137/625.65 |
| 5,918,818 A * | 7/1999 | Takeda | ..................... | 239/585.1 |
| 6,206,343 B1 * | 3/2001 | Kato et al. | ............. | 251/129.15 |
| 6,408,883 B2 * | 6/2002 | Motoki et al. | .......... | 137/625.64 |
| 6,498,416 B1 * | 12/2002 | Oishi et al. | .................. | 310/214 |
| 6,512,436 B2 * | 1/2003 | Igarashi et al. | .............. | 335/281 |
| 6,604,726 B2 * | 8/2003 | Kumar | ................... | 251/129.16 |
| 6,953,186 B2 * | 10/2005 | Kaneda et al. | ........... | 251/129.2 |
| 6,968,816 B2 * | 11/2005 | Isobe et al. | .............. | 123/90.17 |
| 7,014,168 B2 * | 3/2006 | Shimura et al. | ......... | 251/129.15 |
| 7,204,473 B2 * | 4/2007 | Yoshimura et al. | ..... | 251/129.15 |
| 7,273,206 B2 * | 9/2007 | Sato et al. | .............. | 251/129.15 |
| 7,280,021 B2 * | 10/2007 | Nagasaki | .................... | 335/255 |
| 2001/0009164 A1 * | 7/2001 | Motoki et al. | .......... | 137/625.65 |

(Continued)

FOREIGN PATENT DOCUMENTS

JP 2003329164 A * 11/2003

(Continued)

*Primary Examiner*—Elvin G Enad
*Assistant Examiner*—Alexander Talpalatskiy
(74) *Attorney, Agent, or Firm*—Nixon & Vanderhye PC (57) ABSTRACT

A solenoid includes a stator core, a plunger, a ring core, and a magnetic circuit component. The stator core has a fixed axial end and a free axial end. The free axial end is unfixed. The stator core is formed of a magnetic material. The plunger is slidable along an inner surface of the stator core. The plunger is formed of a magnetic material. The ring core surrounds an outer surface of the free axial end of the stator core. The ring core is formed of a magnetic material. The magnetic circuit component is adjacent to the stator core. The magnetic circuit component conducts magnetic flux with the stator core. The ring core radially conducts radial magnetic flux with the stator core. The ring core axially conducts axial magnetic flux with the magnetic circuit component.

11 Claims, 8 Drawing Sheets

U.S. PATENT DOCUMENTS

| | | | |
|---|---|---|---|
| 2002/0134444 A1* | 9/2002 | Isobe | 137/625.65 |
| 2004/0112445 A1* | 6/2004 | Fischer | 137/625.64 |
| 2004/0155214 A1* | 8/2004 | Kirsch et al. | 251/129.15 |
| 2006/0017031 A1* | 1/2006 | Hofling | 251/129.07 |
| 2006/0017535 A1* | 1/2006 | Nagasaki | 335/220 |
| 2006/0180783 A1* | 8/2006 | Tackes et al. | 251/129.15 |
| 2007/0023722 A1* | 2/2007 | Oishi | 251/129.15 |

FOREIGN PATENT DOCUMENTS

| | | |
|---|---|---|
| JP | 2004-144230 | 5/2004 |
| JP | 2004-301294 | 10/2004 |
| JP | 2004-324882 | 11/2004 |

* cited by examiner

LINEAR SOLENOID HAVING STATOR CORE AND PLUNGER

CROSS REFERENCE TO RELATED APPLICATIONS

This application is based on and incorporates herein by reference Japanese Patent Application No. 2005-131726 filed on Apr. 28, 2005.

FIELD OF THE INVENTION

The present invention relates to a linear solenoid having a stator core and a plunger.

BACKGROUND OF THE INVENTION

According to JP-A-2004-144230, JP-A-2004-301294, and JP-A-2004-324882, electromagnetic valves (solenoid valves) are disclosed. A conventional structure of a solenoid valve is described in reference to FIGS. 11A, 11B. This solenoid valve is constructed of a spool valve 1 and a linear solenoid 2 for controlling hydraulic pressure through the spool valve 1. The linear solenoid 2 is constructed of a coil 13, a plunger 14 and a magnetic stator 15 for operating the spool valve 1. The magnetic stator 15 is a component of a magnetic circuit. The magnetic stator 15 is constructed of a yoke 17 formed of a magnetic material. The yoke 17 has a substantially cap shape, and covers the outer surface of the coil 13 and a stator core 21.

Figure 11A:
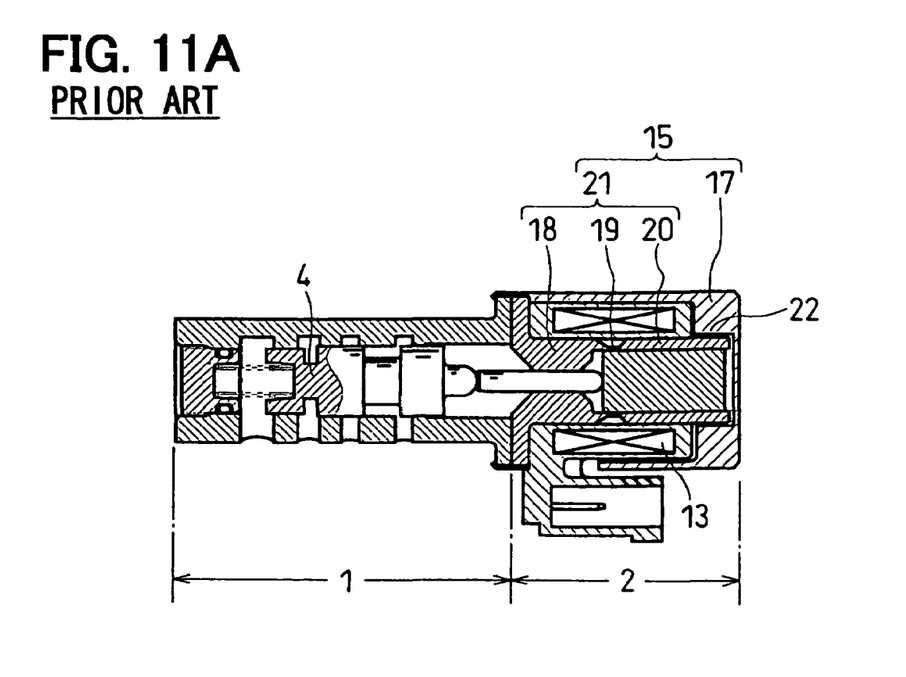

In this embodiment, the stator core 21 includes a magnetic attractive core 18, a slide core 20 and a magnetic interrupting portion 19, which are integrally coupled. The magnetic attractive core 18 generates magnetic force, thereby axially attracting the plunger 14. The slide core 20 is in a cylindrical shape covering the surface of the plunger 14, thereby being slidable relative to the plunger 14. The magnetic interrupting portion 19 interrupts magnetism between the magnetic attractive core 18 and the slide core 20. The plunger 14 is axially moved by changing conduction of an electric current to the coil 13, so that a spool 4 of the spool valve 1 is displaced in the axial direction thereof.

The stator core 21 has an unfixed axial end (free axial end), which is unfixed in the linear solenoid 2. Specifically, the stator core 21 is inserted through an opening of the yoke 17, and is fixed around the opening of the yoke 17 on the other fixed axial end of the stator core 21. Thus, one axial end of the slide core 20 on the axially opposite side of the fixed axial end of the stator core 21 is unfixed.

Figure 11B:
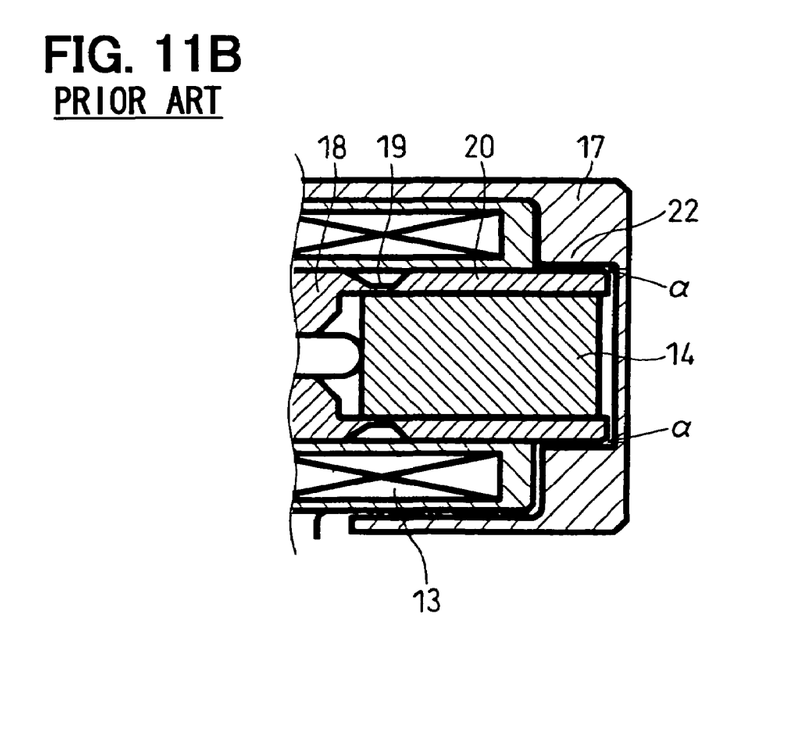
FIG. 11B is an enlarged partially cross sectional side view showing the linear solenoid, according to a prior art.

As shown in FIG. 11B, the unfixed axial end (free axial end) of the slide core 20 is a free end assembled into the inside of an insertion recess 22 formed in a cap bottom portion of the yoke 17. In this structure, the free end of the slide core 20 may abut the inner surface of the insertion recess 22 due to product dispersion of the stator core 21, an axial misalignment at an assembly work. In this case, this free end of the slide core 20 may be deformed, and the plunger 14 may not slide properly.

Accordingly, a sufficient assembly clearance (radial clearance) α radially between the free end of the slide core 20 and the insertion recess 22 is needed. As such, abutment between the slide core 20 and the insertion recess 22 is unlikely.

However, in this structure, a magnetic circuit is defined through this assembly clearance α. Therefore, magnetic transmission efficiency and magnetic attractive performance of the plunger 14 may be reduced, as the assembly clearance α increases. Specifically, the large assembly clearance α is needed between the free end of the stator core 21 and an adjacent magnetic circuit component in this linear solenoid 2, in which the free end of the stator core 21 is unfixed. Therefore, the magnetic attractive performance of the plunger 14 may become insufficient.

SUMMARY OF THE INVENTION

In view of the foregoing and other problems, it is an object of the present invention to produce a linear solenoid having a structure, in which magnetic attractive force is unlikely to be can be restricted from being reduced.

According to one aspect of the present invention, a solenoid includes a stator core, a plunger, a ring core, and a magnetic circuit component. The stator core has a fixed axial end and a free axial end. The stator core is formed of a magnetic material. The plunger is slidable along an inner surface of the stator core. The plunger is formed of a magnetic material. The ring core is disposed around an outer surface of the free axial end of the stator core. The ring core is formed of a magnetic material. The magnetic circuit component is adjacent to the stator core. The magnetic circuit component conducts magnetic flux with the stator core. The ring core radially conducts radial magnetic flux with the stator core. The ring core axially conducts axial magnetic flux with the magnetic circuit component.

Alternatively, a solenoid includes a plunger, a stator core, a coil, a yoke, and a ring core. The plunger is in a substantially columnar shape. The plunger is formed of a magnetic material. The stator core includes a slide core and an attractive core, which are integrally formed of a magnetic material. The attractive core and the slide core have a magnetic interrupting portion therebetween for magnetically interrupting the attractive core from the slide core. The slide core is in a substantially cylindrical shape. The slide core is slidably disposed around an outer surface of the plunger. The coil has an opening, through which the stator core is inserted. The yoke is in a substantially cap shape. The yoke is disposed around an outer surface of the coil. The yoke is fixed to a fixed axial end of the stator core. The yoke is formed of a magnetic material. The ring core is disposed around an outer surface of an axial end of the slide core, which is axially distant from the fixed axial end of the stator core. The ring core is formed of a magnetic material. The attractive core axially attracts the plunger by magnetic force generated using the coil when the coil is conducted with an electric current. The ring core conducts radial magnetic flux with the plunger via the slide core with respect to a radial direction of the ring core. The ring core conducts axial magnetic flux with a bottom portion of the yoke with respect to an axial direction of the ring core.

Alternatively, a solenoid includes a stator core, a plunger, a ring core, and a magnetic circuit component. The stator core is formed of a magnetic material. The plunger is slidable along an inner surface of the stator core. The plunger is formed of a magnetic material. The ring core is disposed around an outer surface of a free axial end of the stator core. The ring core is formed of a magnetic material. The magnetic circuit component is adjacent to the stator core. The magnetic circuit component conducts magnetic flux with the stator core. The ring core radially conducts radial magnetic flux with the stator core. The ring core axially conducts axial magnetic flux with the magnetic circuit component. The ring core and the free axial end of the stator core define a first radial clearance therebetween on a radially first side. The ring core and the free axial end of the stator core define a second radial clearance therebetween on a radially second side, which is opposite to the radially first side with respect to a radial direction of the ring core. The second radial clearance is less than the first radial clearance when a center axis of the stator core is located substantially in parallel with a direction of gravitational force. The second radial clearance is located on an upper side of the first radial clearance with respect to the direction of gravitational force, when the center axis of the stator core is located substantially perpendicular to the direction of gravitational force.

BRIEF DESCRIPTION OF THE DRAWINGS

The above and other objects, features and advantages of the present invention will become more apparent from the following detailed description made in reference to the accompanying drawings. In the drawings:

FIG. 5A is a front view showing a ring core of the linear solenoid.

FIG. 7A is a front view showing a ring core of the linear solenoid.

FIG. 11A is a partially cross sectional side view showing a spool valve and a linear solenoid.

DETAILED DESCRIPTION OF PREFERRED EMBODIMENTS

First Embodiment

Figure 1:
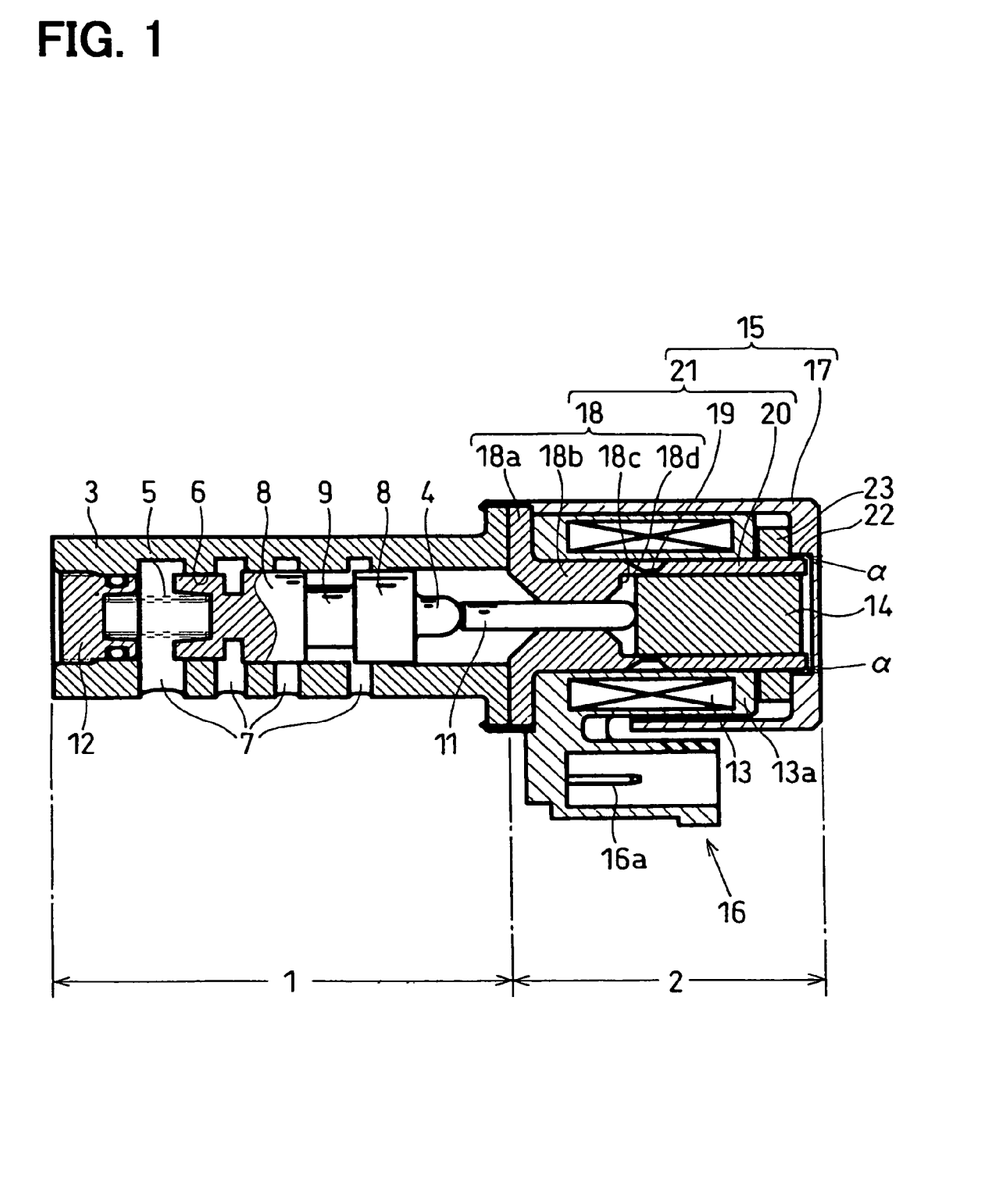
FIG. 1 is a partially cross sectional side view showing a spool valve and a linear solenoid according to a first embodiment of the present invention.

As shown in FIG. 1, an electromagnetic valve (solenoid valve) is mounted to a hydraulic controller of an automatic speed change gear, for example. Specifically, the solenoid valve of the first embodiment is sunk within oil in the interior of a case of the hydraulic controller, so that the solenoid valve is hermetically sealed in oil with respect to the exterior of the case. The solenoid valve includes a spool valve 1 and a linear solenoid 2. The linear solenoid 2 is adapted to operating the spool valve 1.

The spool valve 1 includes a sleeve 3, a spool 4, and a return spring 5. The sleeve 3 has a substantially cylindrical shape. The sleeve 3 has an insertion hole 6 extending substantially along an axial center of the sleeve 3. The insertion hole 6 supports the spool 4 slidably along a substantially axial direction thereof. Oil ports 7 are formed substantially along the radial direction of the sleeve 3. The oil ports 7 include an inlet port, an outlet port, an exhaust port, and a drain port, for example. The inlet port of the oil ports 7 communicates with an oil discharge port of an oil pump (not shown), thereby being applied with inlet pressure. The outlet port of the oil ports 7 applies pressure controlled by operating the solenoid valve. The exhaust port of the oil ports 7 communicates with a low pressure passage. The drain port of the oil ports 7 is used for breathing.

The spool 4 is slidable in the sleeve 3. The spool 4 slides in the sleeve 3 to change an opening area of the oil ports 7. The spool 4 is adapted to switch the communicating state of the oil ports 7. The spool 4 has multiple lands 8 and a small diameter portion 9. The multiple lands 8 are adapted to blocking at least one of the oil ports 7. The small diameter portion 9 is arranged between the lands 8.

A shaft 11 extends into the linear solenoid 2. The spool 4 has an axial end that faces the linear solenoid 2. The shaft 11 abuts on this axial end of the spool 4. A tip end of the shaft 11 abuts a plunger 14. An axial movement of the plunger 14 causes an axial movement of the shaft 1, which thereby axially moves the spool 4. The plunger 14 operates the shaft 11 so as to move the spool 4 in a substantially axial direction thereof.

The spring 5 is a compression coil spring for biasing the spool 4 toward the linear solenoid 2. The spring 5 is disposed in a spring chamber defined in the sleeve 3 on the left side in FIG. 1. One axial end of this spring 5 abuts on the face of the spool 4 on the left side in FIG. 1. The other axial end of the spring 5 abuts on the bottom face of an adjusting screw 12. The adjusting screw 12 blocks the open end of the insertion hole 6 of the sleeve 3 on the left side in FIG. 1. Biasing force generated using the spring 5 can be adjusted by turning the adjusting screw 12 relative to the sleeve 3.

The linear solenoid 2 includes a coil 13, the plunger 14, a magnetic stator 15, and a connector 16. The coil 13 generates magnetic force when an electric current is conducted with this coil 13. The coil 13 generates magnetic flux loop passing through the plunger 14 and the magnetic stator 15. The coil 13 is constructed by winding a lead wire around the surface of a resinous bobbin 13a for a large number of turns. The lead wire is an enamel wire coated with an insulative material, for example.

The plunger 14 is formed of a magnetic material such as a ferromagnetic material. The plunger 14 is in a substantially columnar shape. The ferromagnetic material may be iron. This plunger 14 is slidable along the inner surface of the magnetic stator 15. Specifically, the plunger 14 is slidable directly on the inner surface of a stator core 21. The plunger 14 has the axial end face, which is faces the spool 4. The axial end face of the plunger 14 abuts the tip end of the shaft 11. The plunger 14 is also biased together with the spool 4 via the shaft 11 to the right side in FIG. 1 by the biasing force of the spring 5. A breathing hole (breathing groove, not shown) axially extends through the interior of the plunger 14.

The magnetic stator 15 is constructed of a yoke 17 and a stator core 21. The yoke 17 is formed of a magnetic material. The yoke 17 is in a substantially cap-shape and covering the outer surface of the coil 13. The stator core 21 is formed of a magnetic material by integrally coupling a magnetic attractive core 18, a magnetic interrupting portion 19, and a slide core 20. The stator core 21 is inserted through an opening of the yoke 17 on the left side in FIG. 1. The stator core 21 is fixed together with the sleeve 3 around the opening of the yoke 17.

The yoke 17 is formed of a magnetic material such as a ferromagnetic material for conducting magnetic flux by covering the surface of the coil 13. This ferromagnetic material may be iron. The yoke 17 is firmly connected to the sleeve 3 by caulking a claw portion provided to the end portion of the yoke 17, after the components of the linear solenoid 2 are assembled into the yoke 17.

The magnetic attractive core 18 is formed of a magnetic material such as a ferromagnetic material. This ferromagnetic material may be iron. The magnetic attractive core 18 includes a flange portion 18a and an attractive portion 18b. The flange portion 18a is magnetically coupled to the open end of the yoke 17. The attractive portion 18b is axially opposed to the plunger 14. This attractive portion 18b supports the shaft 11 slidably with respect to the axial direction thereof. A magnetic attractive portion (main magnetic gap) is formed between the attractive portion 18b and the plunger 14. A breathing hole (breathing groove, not shown) extends axially through the interior of the attractive portion 18b.

An attractive concavity 18c is formed in the magnetic attractive core 18. One axial end of the plunger 14 is adapted to entering the attractive concavity 18c. The magnetic attractive core 18 and the one axial end of the plunger 14 are arranged so as to at least partially crossover with respect to the axial direction thereof. A taper 18d is formed on the outer surface of the attractive concavity 18c. This taper 18d has a characteristic, in which magnetic attractive force is restricted from changing with respect to the stroke of the plunger 14.

The magnetic interrupting portion 19 is a thin wall producing a large magnitude of magnetic resistance. This magnetic interrupting portion 19 impedes magnetic flux from being conducted directly between the magnetic attractive core 18 and the slide core 20.

The slide core 20 is formed of a magnetic material such as a ferromagnetic material. This ferromagnetic material may be iron. The slide core 20 is in a substantially cylindrical shape for approximately covering the entire surface of the plunger 14. The slide core 20 is magnetically coupled to the cap bottom portion of the yoke 17 on the right side in FIG. 1. The plunger 14 is slidable directly on the inner surface of the slide core 20. The slide core 20 and the plunger 14 conduct radial magnetic flux therebetween.

The connector 16 is electrically connected with an unillustrated electronic controller via a wiring, so that the solenoid valve is controlled using the electronic controller. Terminals 16a are accommodated in the connector 16, and are connected with both wire ends of the coil 13.

The stator core 21 is inserted from the opening of the yoke 17 to construct the linear solenoid 2. The stator core 21 is fixed to the yoke 17 through the opening of the yoke 17. The tip end of the slide core 20 on the right end side in FIG. 1 is a free end (free axial end) unfixed to the yoke 17. This free end of the slide core 20 is located on the side axially distant from the fixed portion of the stator core 21.

The slide core 20 is thus assembled into an insertion recess 22 formed in the cap bottom portion of the yoke 17 in a state, in which the slide core 20 is unfixed on the right end side thereof in FIG. 1. In this condition, the free end of the slide core 20 may hit against the insertion recess 22 due to product dispersion of the stator core 21, an axial misalignment in an assembly work thereof, and the like. As a result, deformation may arise in the slide core 20. When this deformation of the slide core 20 arises, the sliding motion of the plunger 14 along the inside of the slide core 20 may be obstructed.

In this structure, an assembly clearance α is needed to sufficiently absorb product dispersion of the stator core 21 and axial misalignment in an assembly work thereof. This assembly clearance α is formed between the tip end of the slide core 20, on the free end side of the stator core 21, and the insertion recess 22. This insertion recess 22 is formed in a magnetic circuit component adjacent to the slide core 20.

However, in this structure, a magnetic circuit is defined through the assembly clearance α. Accordingly, as the assembly clearance α increases, magnetic transmission efficiency and magnetic attractive performance of the plunger 14 are reduced. That is, the magnetic attractive performance of the plunger 14 is reduced due to forming the assembly clearance α.

In view of this problem, the structure of the linear solenoid 2 of the first embodiment is described as follows. In the structure of this first embodiment, a ring core 23 is provided to the tip end of the slide core 20. This tip end of the slide core 20 is an example of an axially unfixed side of the stator core 21. The ring core 23 is preferably formed of a magnetic material such as a ferromagnetic material. This ferromagnetic material may be iron, or the like. The ring core 23 conducts radial magnetic flux with the slide core 20 by covering the outer surface of the slide core 20. The ring core 23 makes contact with the cap bottom portion of the yoke 17, thereby conducting axial magnetic flux with the yoke 17. This yoke 17 is an example of a magnetic circuit component adjacent to the stator core 21.

The ring core 23 is in a substantially annular disk shape having a predetermined thickness, for example. The ring core 23 is arranged axially between the bobbin 13a and the cap bottom portion of the yoke 17. This ring core 23 has the inner surface, which is a substantially cylindrical surface being substantially in parallel with the outer surface of the slide core 20, for example. This inner surface of the ring core 23 and the outer surface of the slide core 20 form a slight clearance, which is an assembly clearance for an assembly work thereof. The inner surface of the ring core 23 is mounted slidably axially along the outer surface of the slide core 20.

The ring core 23 is slightly thinner than the axial clearance between the bobbin 13a and the cap bottom portion of the yoke 17, so as not to restrict the fixation of the stator core 21 with the yoke 17. Even in this structure, the ring core 23 is magnetically attracted to be abutting onto the cap bottom portion of the yoke 17 when an electric current is conducted with the coil 13.

The outer surface of the ring core 23 and the inner surface of the yoke 17 form a radial clearance therebetween. The ring core 23 is radially movable in accordance with radial displacement of the tip end of the slide core 20 on the right side in FIG. 1. The radial clearance between the ring core 23 and the yoke 17 is greater than a sum of a first radial eccentricity and a second radial eccentricity. The first radial eccentricity is an amount of radial eccentricity of the tip end of the slide core 20 corresponding to a product dispersion of the stator core 21. The second radial eccentricity is an amount of radial eccentricity of the tip end of the slide core 20 corresponding to axial misalignment in an assembly work thereof.

In the linear solenoid 2 of the first embodiment, the ring core 23 formed of a magnetic material is arranged around the free end of the slide core 20. Thus, the radial magnetic flux is transmitted to the slide core 20, and the axial magnetic flux is transmitted to the cap bottom portion of the yoke 17 adjacent to the slide core 20.

In this structure, the stator core 21 is fixed only on the left side thereof in FIG. 1, and the slide core 20 of the stator core 21 is unfixed in the tip end thereof on the right side in FIG. 1. In this structure, even when the assembly clearance α is interposed between the free end of the slide core 20 and the insertion recess 22 of the adjacent yoke 17, the free end of the slide core 20 and the cap bottom portion of the yoke 17 are magnetically coupled via the ring core 23. Thus, a reduction in magnetic flux due to the assembly clearance α can be decreased.

That is, magnetic flux can be maintained by providing the ring core 23, even the assembly clearance α is interposed between the free end of the slide core 20 and the adjacent yoke 17 for restricting the slide core 20 from being deformed. Thus, performance of the linear solenoid 2 and the solenoid valve can be maintained.

Further, in the above structure, the stator core 21 is fixed on only the left side in FIG. 1, and the slide core 20 of the stator core 21 is unfixed in the free end thereof on the right side in FIG. 1. In this structure, the assembly clearance α between the free end of the slide core 20 and the insertion recess 22 of the adjacent yoke 17 is capable of sufficiently absorbing product dispersion of the stator core 21 and axial misalignment in an assembly work thereof. Therefore, the slide core 20 can be reliably restricted from being deformed, so that the sliding movement of the plunger 14 can be also readily restricted from causing a defect due to the deformation of the slide core 20.

Second Embodiment

Figure 2:
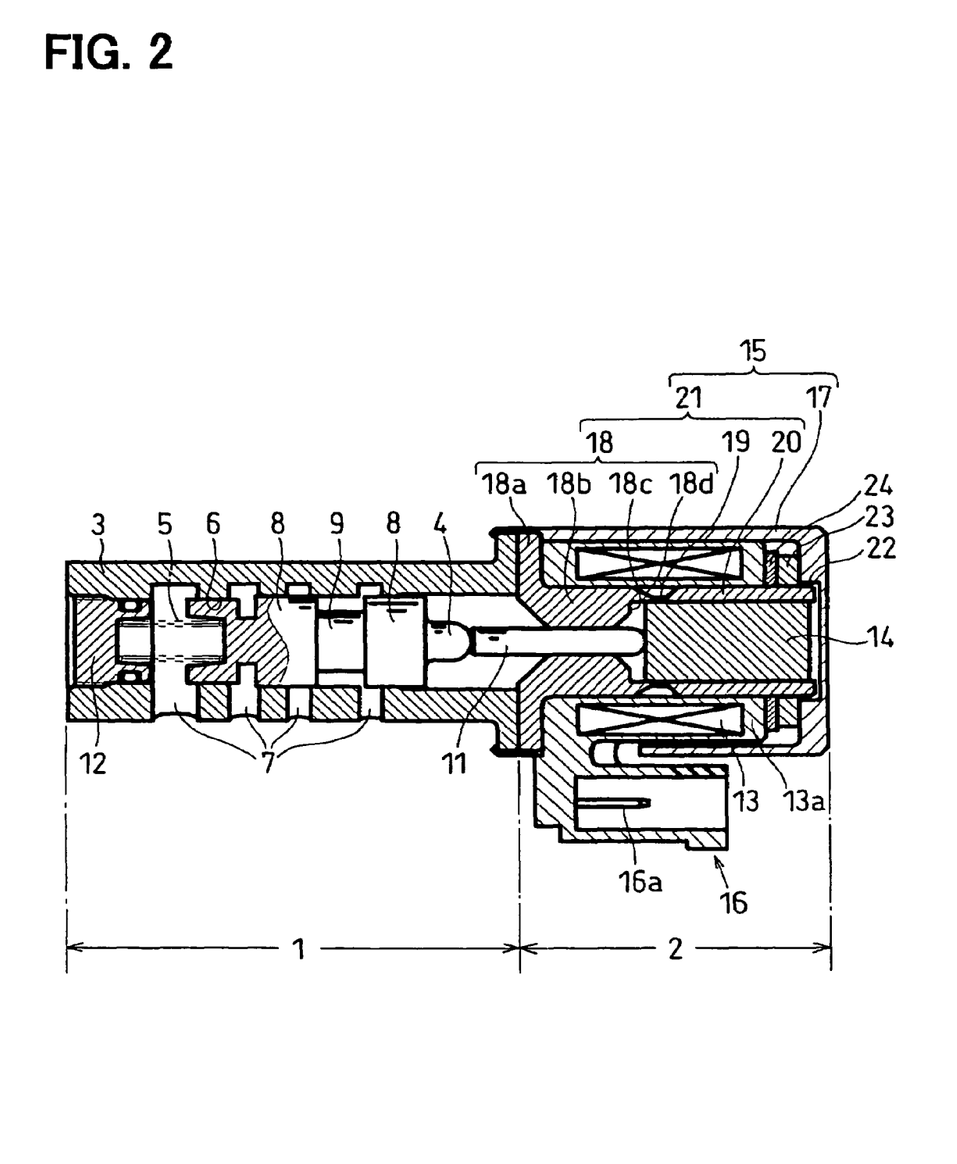
FIG. 2 is a partially cross sectional side view showing a spool valve and a linear solenoid according to a second embodiment of the present invention.

The second embodiment is described in reference to FIG. 2. In this embodiment, an axial bias member 24 is provided to be in a compressed state between the bobbin 13a and the ring core 23, so that the ring core 23 is urged against the cap bottom portion of the adjacent yoke 17 by the resiliency of the axial bias member 24. The axial bias member 24 may be formed of elastic resin such as rubber that has oil resisting properties. The axial bias member 24 may alternatively be a belleville spring such as a taper washer, a wave washer, or the like. The axial bias member 24 generates restoring force by being compressed, thereby biasing the ring core 23.

The ring core 23 makes contact with the cap bottom portion of the yoke 17 in this structure even when electric current is not conducted with the coil 13. Therefore, it is possible to enhance a response from conducting an electric current with the coil 13 until the ring core 23 makes contact with the cap bottom portion of the yoke 17. Further, noise can be reduced when the ring core 23 abuts on the cap bottom portion of the yoke 17 when conducting an electric current with the coil 13. Therefore, this structure can be applied effectively to the linear solenoid 2, in which an electric current is repeatedly conducted and terminated.

Further, this steady contact structure between the ring core 23 and the cap bottom portion of the yoke 17 can be produced by biasing the ring core 23 against the cap bottom portion of the yoke 17 using the axial bias member 24. Therefore, the reliability of the linear solenoid 2 can be enhanced.

In this embodiment, the axial bias member 24 urges the ring core 23 against the cap bottom portion of the yoke 17. In this structure, fixing force of the ring core 23 generated using the axial bias member 24 is relatively low. Therefore, the position of the ring core 23 can be aligned with respect to the radial direction in accordance with a radial displacement of the slide core 20.

Third Embodiment

Figure 3:
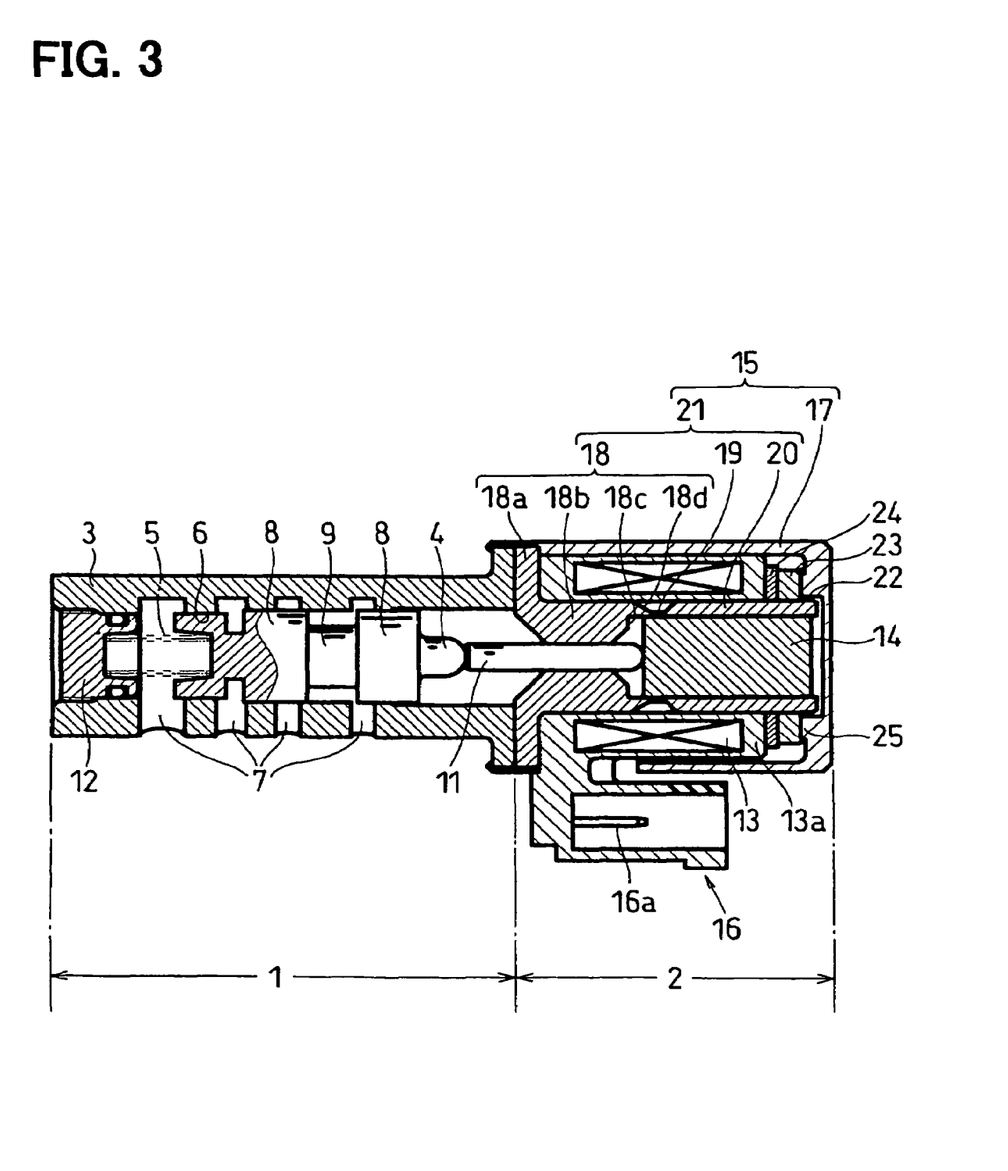
FIG. 3 is a partially cross sectional side view showing a spool valve and a linear solenoid according to a third embodiment of the present invention.

The third embodiment is described in reference to FIG. 3. In this structure, either the ring core 23 or the cap bottom portion of the yoke 17 has an annular protrusion 25. The ring core 23 and the cap bottom portion of the yoke 17 axially come in contact with each other on the radially outer side of the slide core 20 via the substantially annular surface formed on the annular protrusion 25. For example, in this third embodiment, the annular protrusion 25 is arranged in the cap bottom portion of the yoke 17. The contact area in this contact structure between the ring core 23 and the cap bottom portion of the yoke 17 can be constantly set via the annular protrusion 25, even when the ring core 23 is radially displaced corresponding to a radial displacement of the free end of the slide core 20. Thus, variation in the contact area between the ring core 23 and the cap bottom portion of the yoke 17 can be reduced in this contact structure, so that eccentric magnetic flux and variation in magnetic flux can be restricted from arising.

Fourth Embodiment

Figure 4:
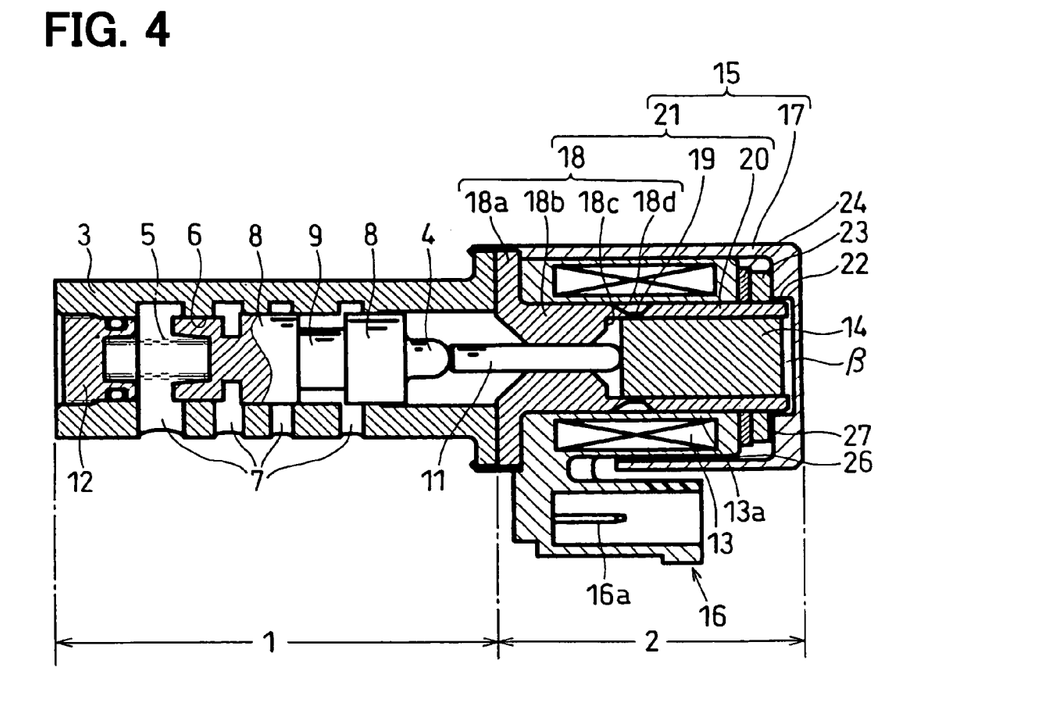
FIG. 4 is a partially cross sectional side view showing a spool valve and a linear solenoid according to a fourth embodiment of the present invention.
Figure 5A:
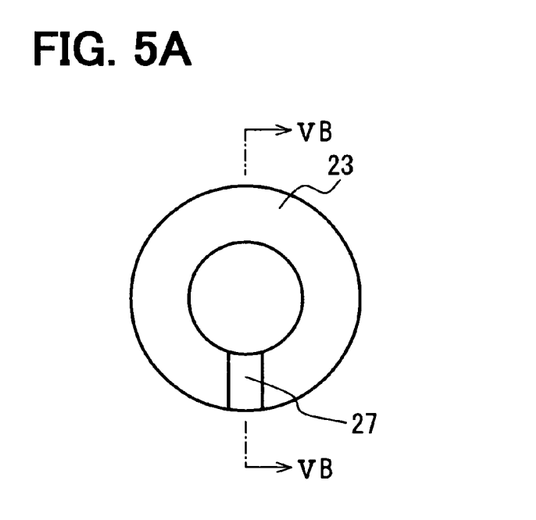
Figure 5B:
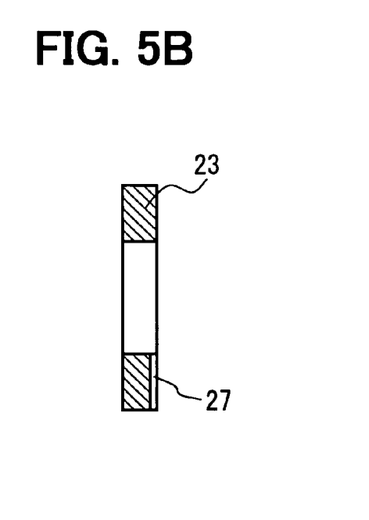
FIG. 5B is a cross sectional side view showing the ring core taken along the line VB-VB in FIG. 5A, according to the fourth embodiment.

The fourth embodiment is described in reference to FIGS. 4, 5A, and 5B. The right end of the plunger 14 in FIG. 4 and the cap bottom portion of the yoke 17 form a plunger tip chamber β therebetween. The plunger 14 is axially displaced, so that the volume of the plunger tip chamber β changes. A breathing passage 26 is formed in the linear solenoid 2 for communicating the plunger tip chamber β with the exterior of the linear solenoid 2. This breathing passage 26 extends from a base of the connector 16 through a space radially between the outer periphery of the coil 13 and the inner periphery of the yoke 17. The breathing passage 26 serves as an oil passage that communicates with the plunger tip chamber β.

In the above embodiments, the ring core 23 is arranged between the coil 13 and the cap bottom portion of the yoke 17. In these structures, the breathing passage 26 may be interrupted by the ring core 23. The breathing groove 27 may be formed by applying mechanical work to the cap bottom portion of the yoke 17. However, it is difficult to form the breathing groove 27 in the cap bottom portion of the yoke 17, because of difficulty in performing a mechanical work on the bottom wall of the yoke 17. Therefore, in this fourth embodiment, as shown in FIGS. 5A, 5B, the breathing groove 27 is formed in the ring core 23 for communicating the radially inner side of the ring core 23 with the radially outer side of the ring core 23. In this structure, manufacturing cost of the linear solenoid 2 can be reduced by readily forming the breathing groove 27 in the ring core 23.

Fifth Embodiment

Figure 6:
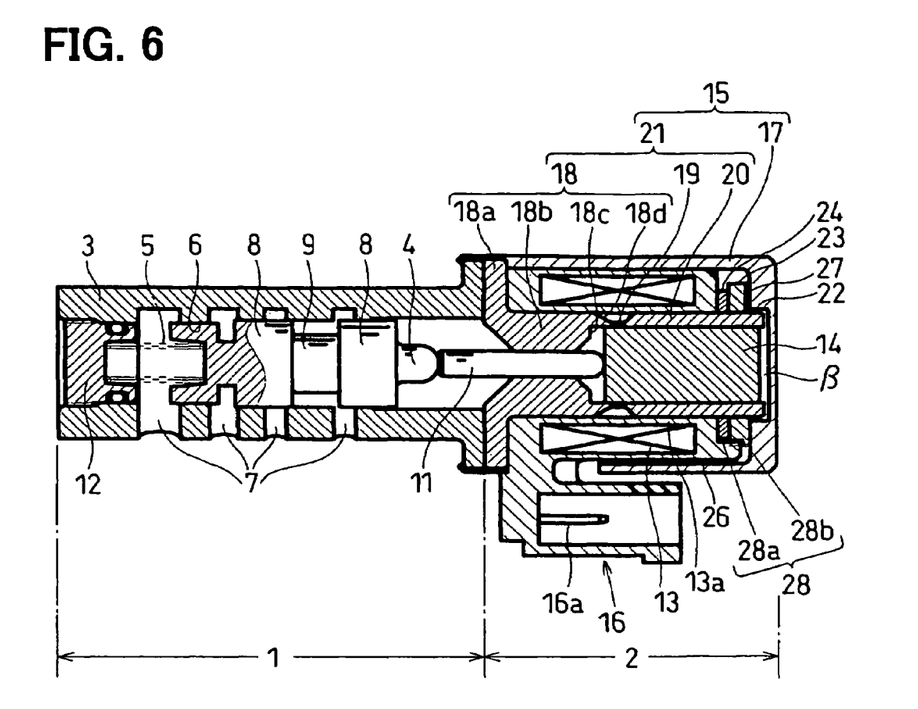
FIG. 6 is a partially cross sectional side view showing a spool valve and a linear solenoid according to a fifth embodiment of the present invention.
Figure 7A:
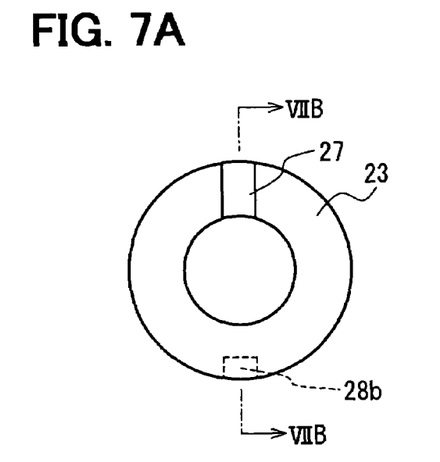
Figure 7B:
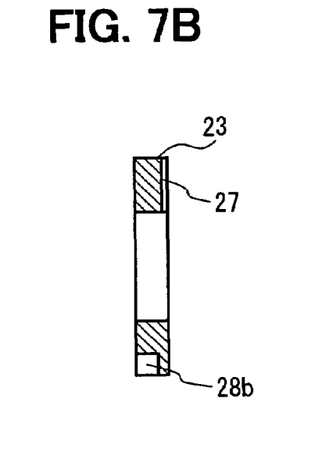
FIG. 7B is a cross sectional side view showing the ring core taken along the line VIIB-VIIB in FIG. 7A, according to the fifth embodiment.

The fifth embodiment is described in reference to FIGS. 6, 7A, and 7B. The breathing groove 27 in the fourth embodiment needs to be oriented to a substantially bottom side thereof in order to enhance an exhausting performance of foreign matters. In addition, the direction of the breathing groove 27 needs to further adjusted so as to set the length of a breathing passage 26 passing the breathing groove 27 at an arbitrary length. For example, the length of the breathing passage 26 may be increased in the solenoid valve in order to restrict foreign matters contaminated in oil from intruding into the plunger 14. Therefore, the position of the breathing groove 27 of the ring core 23 needs to be adjusted at a position different from an external opening of the breathing passage 26 in the base of the connector 16.

Therefore, the ring core 23 and a fixing member such as the bobbin 13a and yoke 17 adjacent to this ring core 23 are engaged via a rotation regulating unit 28, in order to regulate the rotation angle of the ring core 23.

This rotation regulating unit 28 regulates the rotation angle of the ring core 23 by engaging a protruding portion and a recessed portion. Specifically, as shown in FIG. 6, in this fifth embodiment, a rotation regulating protrusion 28a is arranged on the external opening side of the breathing passage 26 on the lower side thereof in FIG. 6. This rotation regulating protrusion 28a is arranged in an axial tip end of the bobbin 13a. As shown in FIGS. 7A, 7B, a rotation regulating recession 28b is arranged in a position different from the breathing groove 27 in the ring core 23. The breathing groove 27 of the ring core 23 is directed to the position different from the external opening of the breathing passage 26 on the side of the base of the connector 16. This breathing groove 27 is aligned by engaging the rotation regulating protrusion 28a and the rotation regulating recession 28b. The bobbin 13a is an example of the adjacent fixing member.

Sixth Embodiment

Figure 8:
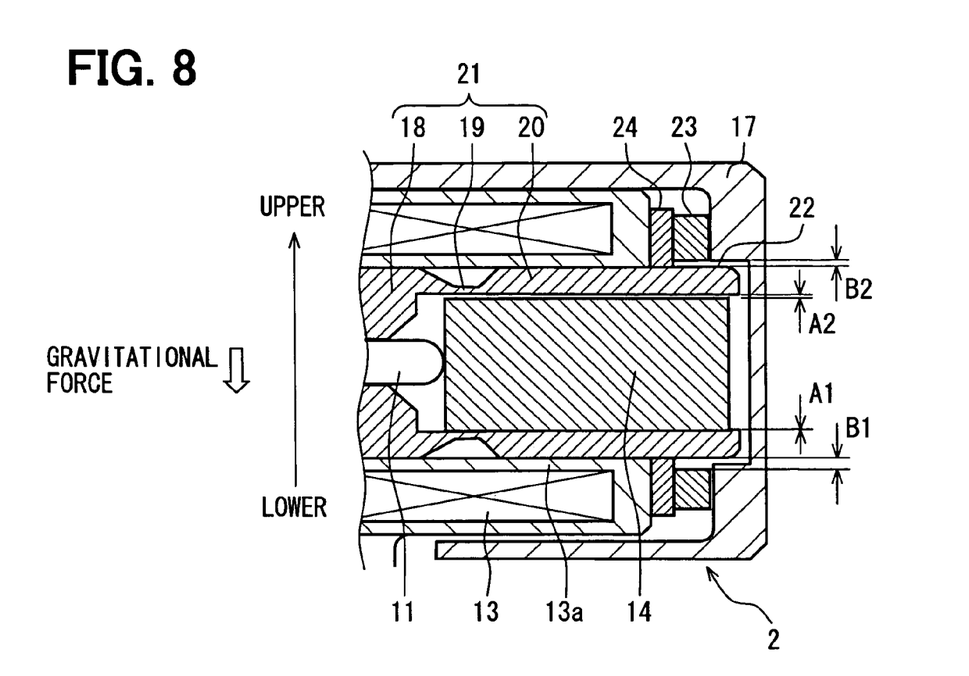
FIG. 8 is an enlarged partially cross sectional side view showing a linear solenoid, according to a sixth embodiment of the present invention.

The sixth embodiment is described in reference to FIG. 8. In this sixth embodiment, the axial direction of the solenoid valve is arranged along the horizontal direction of the vehicle when the solenoid valve is mounted to the vehicle. This axial direction of the solenoid valve is in parallel with a sliding direction, along which the plunger 14 slides in the solenoid valve. The horizontal direction may be inclined. The plunger 14 and the slide core 20 form a small sliding clearance therebetween. In this structure, gravitation is vertically applied to the plunger 14. Accordingly, a sliding clearance A1 between the plunger 14 and the slide core 20 on the lower side thereof may be reduced, and a sliding clearance A2 on the upper side thereof may be increased in the condition in which the solenoid valve is arranged along the horizontal direction. As a result, conduction of radial magnetic flux between the plunger 14 and the slide core 20 may be increased on the lower side thereof, and may be reversely reduced on the upper side thereof. Consequently, eccentric load may be applied to the plunger 14.

In this sixth embodiment, a radial clearance B2 between the slide core 20 and the ring core 23 on the upper side thereof is set to be smaller than a radial clearance B1 between the slide core 20 and the ring core 23 on the lower side thereof. Thus, conduction of magnetic flux between the slide core 20 and the ring core 23 on the upper side thereof is increased, and conduction of magnetic flux of the slide core 20 and the ring core 23 on the lower side thereof is reversely reduced. Thus, conduction of magnetic flux can be restricted from being reduced between the plunger 14 and the slide core 20 on the upper side thereof due to gravitation. Consequently, magnetic flux can be substantially uniformly produced with respect to the radial direction of the plunger 14, so that resistance in the sliding motion of the plunger 14 due to magnetic eccentricity can be reduced.

Seventh Embodiment

Figure 9:
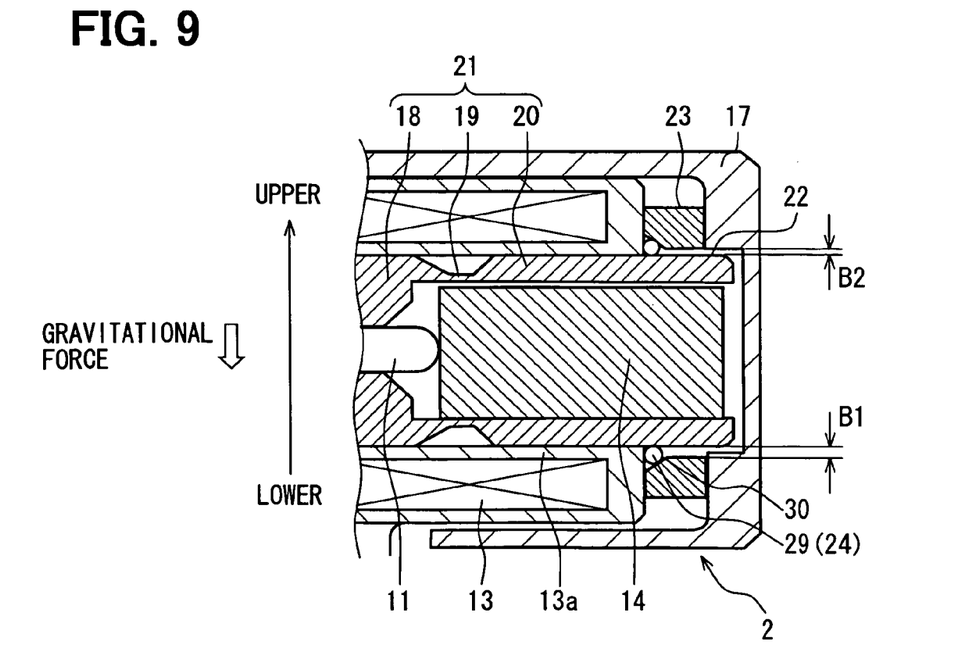
FIG. 9 is an enlarged partially cross sectional side view showing a linear solenoid, according to a seventh embodiment of the present invention.

The seventh embodiment is described in reference to FIG. 9. In this seventh embodiment, the ring core 23 is biased on the lower side thereof by a radial bias member 29. Therefore, the radial clearance B2 between the slide core 20 and the ring core 23 on the upper side thereof is set to be smaller than the radial clearance B1 between the slide core 20 and the ring core 23 on the lower side thereof.

Further, the radial bias member 29 of this seventh embodiment also serves as the axial bias member 24 described in the second embodiment. That is, the axial bias member 24 and the radial bias member 29 are integrated into one common component. In this structure, the ring core 23 is biased on the lower side thereof, and is also biased against the cap bottom portion of the yoke 17.

The radial bias member 29 has the following structure, thereby serving as the axial bias member 24 in this seventh embodiment. The ring core 23 has the inner surface defining a taper face 30 that is radially widened to the side of the bobbin 13a. This taper face 30 is eccentric with respect to the center axis of the ring core 23. This taper face 30 has a wide taper and a narrow taper. The wide taper and the narrow taper may be substantially radially opposite to each other. The wide taper has the width, which is wider than the width of the narrow taper.

The radial bias member 29 is a substantially annular elastic member such as an O-ring formed of rubber. The radial bias member 29 is assembled to the taper face 30 of the bobbin 13a, such that the surface of the wide taper is arranged on the upper side thereof and the narrow taper side is arranged on the lower side thereof. Thus, the radial bias member 29, which biases the ring core 23 on the lower side thereof by reaction force of the elastic member, also serves as the axial bias member 24 biasing the ring core 23 against the cap bottom portion of the yoke 17.

Preferably, the upper and lower sides of the ring core 23 assembled to the bobbin 13a are regulated using the rotation regulating unit 28 described in the above fifth embodiment.

In the sixth and seventh embodiments, the bias member 24, 29 biases the ring core 23 against the yoke 17 with respect to a substantially axial direction of the ring core 23. The slide core 20 has the free axial end that is unfixed on the side of the free axial end of the stator core 21. The ring core 23 and the free axial end of the slide core 20 define a first radial clearance B1 therebetween on a radially first side. The ring core 23 and the free axial end of the slide core 20 define a second radial clearance B2 therebetween on a radially second side, which is opposite to the radially first side with respect to a radial direction of the ring core 23. The second radial clearance B2 is less than the first radial clearance B1 when the center axis of the stator core 21 is located substantially in parallel with the direction of gravitational force. The first radial clearance B1 is located on the upper side of the second radial clearance B2 with respect to the direction of gravitational force, when the center axis of the stator core 21 is located substantially perpendicular to the direction of gravitational force. The bias member 24, 29 is located on the side of the second radial clearance B2 with respect to the first radial clearance B1. The bias member 24, 29 biases the ring core 23 to the side of the second radial clearance B2.

Preferably, the first radial clearance B1 is substantially equivalent to the second radial clearance B2, when the center axis of the stator core 21 is located substantially perpendicular to the direction of gravitational force.

Eighth Embodiment

Each of the above embodiments shows an example, in which the solenoid valve is arranged together with the linear solenoid 2 in the case of the hydraulic controller.

Figure 10A:
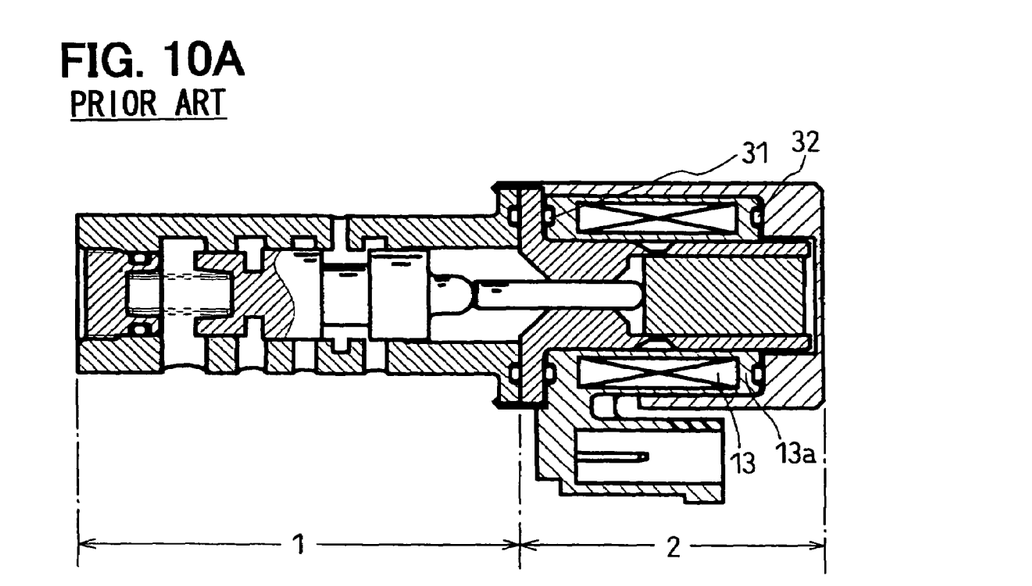
FIG. 10A is a partially cross sectional side view showing a spool valve and a linear solenoid according to a prior art.

According to a prior art shown in FIG. 10A, a spool valve 1 of a solenoid valve is inserted into a case of a hydraulic controller. A linear solenoid 2 is arranged in the exterior of the hydraulic controller, and is exposed to the atmosphere. In this structure, first and second sealants 31, 32 such as O-rings are provided to both axial ends of a bobbin 13a, so that oil is restricted from leaking to the exterior of the hydraulic controller on the side of the linear solenoid 2 exposed to the atmosphere.

Figure 10B:
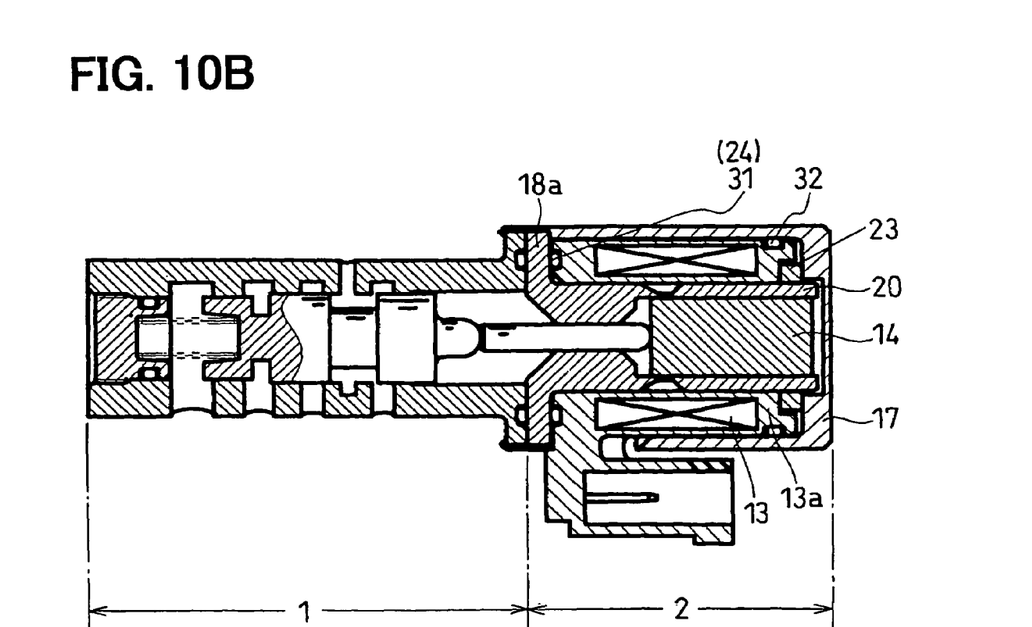
FIG. 10B is a partially cross sectional side view showing a spool valve and a linear solenoid according to a eighth embodiment of the present invention.

The eighth embodiment is described. In this structure of the eighth embodiment, the spool valve 1 of the solenoid valve is also inserted into the case of the hydraulic controller. The linear solenoid 2 is arranged in the exterior of the hydraulic controller, and is exposed to the atmosphere. In this structure, first and second sealants 31, 32 such as O-rings are also provided to the bobbin 13a, so that oil is restricted from leaking to the exterior of the hydraulic controller on the side of the linear solenoid 2 exposed to the atmosphere. Specifically, in this eighth embodiment, the first sealant 31 on the side of the fixed end of the stator core 21 is utilized as the axial bias member 24 for biasing the ring core 23 against the cap bottom portion of the yoke 17. In addition, the ring core 23 is biased against the cap bottom portion of the yoke 17 using the first sealant 31 interposed between the flange portion 18a and the bobbin 13a. The second sealant 32 is arranged in the vicinity of the ring core 23, thereby sealing the radial clearance between the bobbin 13a and the yoke 17. In this structure, axial biasing force of the first sealant 31 is restricted from reduced due to the axial force of the second sealant 32, compared with the prior art shown in FIG. 10A. Further, the end of the bobbin 13a on the right side in FIG. 10B and the cap bottom portion of the yoke 17 form an axial clearance therebetween. In this structure, the axial compression force applied to the ring core 23 is restricted from being reduced due to abutting the end of the bobbin 13a directly on the cap bottom portion of the yoke 17.

Thus, the number of components can be restricted, so that the assembly work and manufacturing cost of the linear solenoid 2 can be also restricted. That is, cost of the solenoid valve can be restricted.

MODIFIED EXAMPLES

The solenoid valve described in the above embodiments is not limited to be applied to a hydraulic controller of an automatic speed change gear. The solenoid valve described in the above embodiments may be also applied to any other devices, in addition to the automatic speed change gear. Further, the structure described in the above embodiments may be also applied to any other electromagnetic devices, in addition to the solenoid valve for controlling hydraulic pressure.

In the above embodiments, the linear solenoid 2 is used for operating a valve such as the spool valve 1. However, the structure of the above embodiments may be also applied to the linear solenoid 2 for directly or indirectly operating a driven body, in addition to a valve.

The above structures of the embodiments can be combined as appropriate.

Various modifications and alternations may be diversely made to the above embodiments without departing from the spirit of the present invention.

What is claimed is:

1. A solenoid comprising:
a stator core that has a fixed axial end, a free axial end, and an inner surface, the free axial end having an outer surface, the stator core being formed of a magnetic material;
a plunger that is slidable along the inner surface of the stator core, the plunger being formed of a magnetic material;
a ring core that is disposed around the outer surface of the free axial end of the stator core, the ring core being formed of a magnetic material; and
a magnetic circuit component that is adjacent to the stator core, the magnetic circuit component conducting magnetic flux with the stator core, wherein
the ring core radially conducts radial magnetic flux with the stator core,
the ring core axially conducts axial magnetic flux with the magnetic circuit component,
the outer surface of the ring core and the magnetic circuit component form a radial clearance therebetween with respect to a radial direction of the ring core, and
the ring core is movable with respect to the radial direction of the ring core in accordance with radial displacement of the free axial end of the stator core.

2. The solenoid according to claim 1, further comprising:
an axial bias member that biases the ring core against the magnetic circuit component with respect to an axial direction of the ring core.

3. The solenoid according to claim 1, wherein at least one of the ring core and the magnetic circuit component has an annular protrusion, via which the ring core makes contact with the magnetic circuit component.

4. The solenoid according to claim 1, wherein the stator is radially interposed between the ring core and the plunger.

5. A solenoid comprising:
a stator core that has a fixed axial end, a free axial end, and an inner surface, the free axial end having an outer surface, the stator core being formed of a magnetic material;
a plunger that is slidable along the inner surface of the stator core, the plunger being formed of a magnetic material;
a ring core that is disposed around the outer surface of the free axial end of the stator core, the ring core being formed of a magnetic material; and
a magnetic circuit component that is adjacent to the stator core, the magnetic circuit component conducting magnetic flux with the stator core, wherein
the ring core radially conducts radial magnetic flux with the stator core, and
the ring core axially conducts axial magnetic flux with the magnetic circuit component,
the ring core has a breathing groove, through which a radially inner side of the ring core communicates with a radially outer side of the ring core,
the solenoid further comprising:
a fixing member that is adjacent to the ring core,
wherein at least one of the fixing member and the ring core has a rotation regulating unit, via which the fixing member engages with the ring core, and
the rotation regulating unit regulates rotation of the ring core with respect to the fixing member.

6. A solenoid comprising:
a stator core that has a fixed axial end, a free axial end, and an inner surface, the free axial end having an outer surface, the stator core being formed of a magnetic material;
a plunger that is slidable along the inner surface of the stator core, the plunger being formed of a magnetic material;
a ring core that is disposed around the outer surface of the free axial end of the stator core, the ring core being formed of a magnetic material; and a magnetic circuit component that is adjacent to the stator core, the magnetic circuit component conducting magnetic flux with the stator core, wherein the ring core radially conducts radial magnetic flux with the stator core, the ring core axially conducts axial magnetic flux with the magnetic circuit component, the ring core has a breathing groove, through which a radially inner side of the ring core communicates with a radially outer side of the ring core, at least one of the magnetic circuit component and the ring core has a rotation regulating unit, via which the magnetic circuit component engages with the ring core, and the rotation regulating unit regulates rotation of the ring core with respect to the magnetic circuit component.

7. A solenoid comprising:

a stator core that has a fixed axial end, a free axial end, and an inner surface, the free axial end having an outer surface, the stator core being formed of a magnetic material;

a plunger that is slidable along the inner surface of the stator core, the plunger being formed of a magnetic material;

a ring core that is disposed around the outer surface of the free axial end of the stator core, the ring core being formed of a magnetic material; and a magnetic circuit component that is adjacent to the stator core, the magnetic circuit component conducting magnetic flux with the stator core, wherein the ring core radially conducts radial magnetic flux with the stator core, the ring core axially conducts axial magnetic flux with the magnetic circuit component, the stator core includes an attractive core and a slide core, which are integrally formed of a magnetic material, the plunger is slidable along an inner surface of the slide core, the attractive core is adapted to magnetically attracting the plunger, and the attractive core and the slide core have a magnetic interrupting portion therebetween for magnetically interrupting the attractive core from the slide core, the solenoid further comprising:

a radial bias member biasing the ring core to the upper side.

8. A solenoid comprising:

a stator core that has a fixed axial end, a free axial end, and an inner surface, the free axial end having an outer surface, the stator core being formed of a magnetic material;

a plunger that is slidable along the inner surface of the stator core, the plunger being formed of a magnetic material;

a ring core that is disposed around the outer surface of the free axial end of the stator core, the ring core being formed of a magnetic material; and a magnetic circuit component that is adjacent to the stator core, the magnetic circuit component conducting magnetic flux with the stator core, wherein the ring core radially conducts radial magnetic flux with the stator core, the ring core axially conducts axial magnetic flux with the magnetic circuit component, the stator core includes an attractive core and a slide core, which are integrally formed of a magnetic material, the plunger is slidable along an inner surface of the slide core, the attractive core is adapted to magnetically attracting the plunger, and the attractive core and the slide core have a magnetic interrupting portion therebetween for magnetically interrupting the attractive core from the slide core, the slide core has a free axial end that is unfixed on a side of the free axial end of the stator core, the ring core and the free axial end of the slide core define a first radial clearance therebetween on a radially first side, the ring core and the free axial end of the slide core define a second radial clearance therebetween on a radially second side, which is opposite to the radially first side with respect to a radial direction of the ring core, the second radial clearance is less than the first radial clearance, and the second radial clearance is located on an upper side of the first radial clearance with respect to the direction of gravitational force.

9. The solenoid according to claim 8, further comprising:

a radial bias member biasing the ring core toward the second radial clearance.

10. A solenoid comprising:

a stator core that has a fixed axial end, a free axial end, and an inner surface, the free axial end having an outer surface, the stator core being formed of a magnetic material;

a plunger that is slidable along the inner surface of the stator core, the plunger being formed of a magnetic material;

a ring core that is disposed around the outer surface of the free axial end of the stator core, the ring core being formed of a magnetic material; and a magnetic circuit component that is adjacent to the stator core, the magnetic circuit component conducting magnetic flux with the stator core, wherein the ring core radially conducts radial magnetic flux with the stator core, and the ring core axially conducts axial magnetic flux with the magnetic circuit component; and a bias member that biases the ring core against the magnetic circuit component with respect to a substantially axial direction of the ring core, wherein the slide core has a free axial end that is unfixed on a side of the free axial end of the stator core, the ring core and the free axial end of the slide core define a lower radial clearance therebetween on a lower side with respect to the direction of gravitational force, the upper radial clearance is less than the lower radial clearance, and the bias member biases the ring core to the upper side of the ring core.

11. A solenoid comprising:

a stator core that has a fixed axial end, a free axial end, and an inner surface, the free axial end having an outer surface, the stator core being formed of a magnetic material;

a plunger that is slidable along the inner surface of the stator core, the plunger being formed of a magnetic material;

a ring core that is disposed around the outer surface of the free axial end of the stator core, the ring core being formed of a magnetic material; and a magnetic circuit component that is adjacent to the stator core, the magnetic circuit component conducting magnetic flux with the stator core, wherein the ring core radially conducts radial magnetic flux with the stator core, and the ring core axially conducts axial magnetic flux with the magnetic circuit component; and a bias member that biases the ring core against the magnetic circuit component with respect to a substantially axial direction of the ring core, wherein the slide core has a free axial end that is unfixed on a side of the free axial end of the stator core, the ring core and the free axial end of the slide core define a first radial clearance therebetween on a radially first side, the ring core and the free axial end of the slide core define a second radial clearance therebetween on a radially second side, which is opposite to the radially first side with respect to a radial direction of the ring core, the second radial clearance is less than the first radial clearance, the second radial clearance is located on an upper side of the first radial clearance with respect to the direction of gravitational force, and the bias member biases the ring core toward the second radial clearance.

* * * * *